United States Patent [19]

Kang

[11] Patent Number: 5,124,906
[45] Date of Patent: Jun. 23, 1992

[54] MULTIPLE TRANSFORMER SWITCH MODE POWER SUPPLY

[76] Inventor: Ki D. Kang, 15520 On Orbit Dr., Saratoga, Calif. 95070

[21] Appl. No.: 464,224

[22] Filed: Jan. 12, 1990

[51] Int. Cl.[5] .......................................... H02M 3/335
[52] U.S. Cl. ......................................... 363/21; 363/19
[58] Field of Search .................... 363/16, 18, 19, 20, 363/21

[56] References Cited

U.S. PATENT DOCUMENTS

| | | | |
|---|---|---|---|
| 4,092,709 | 5/1978 | Voig et al. | 363/18 |
| 4,208,705 | 6/1980 | Hosoya | 363/19 |
| 4,282,567 | 8/1981 | Voig | 363/15 |
| 4,536,733 | 8/1985 | Shelly | 336/182 |
| 4,562,382 | 12/1985 | Elliott | 315/219 |
| 4,665,473 | 5/1987 | Onda et al. | 363/21 |
| 4,680,688 | 7/1987 | Inou et al. | 363/21 |
| 4,764,857 | 8/1988 | Konopka | 363/49 |
| 4,825,348 | 5/1989 | Steigerwald et al. | 363/17 |
| 4,884,180 | 11/1989 | Hoffmann | 363/21 |

FOREIGN PATENT DOCUMENTS 0160073 7/1987 Japan.

*Primary Examiner*—Steven L. Stephan
*Assistant Examiner*—Kristine Peckman
*Attorney, Agent, or Firm*—Michael J. Hughes

[57] ABSTRACT

A switch mode power supply (10) including a switch control circuit (26), a switching device (28), and a plurality of transformers (38) and (40) is disclosed. Turns ratios of the transformers (38) and (40) are selected to produce desired output voltages within acceptable tolerances. A voltage from an output (46) is selected as a feedback voltage and is provided through an isolator (76) to the switch control circuit (26) for regulation thereof. The power supply (10) is characterized in that desired output voltages are produced without the use of supplementary voltage regulators. Output voltages from the transformers (38) are combined and rectified, as required, to produce needed derivative voltages.

4 Claims, 3 Drawing Sheets

MULTIPLE TRANSFORMER SWITCH MODE POWER SUPPLY

TECHNICAL FIELD

The present invention relates generally to electronic power supplies, and more particularly to switch mode type power supplies having more than a single voltage output. The predominant current usage of the improved switch mode power supply of the present invention is as a replacement for conventional power supplies in electronic equipment applications requiring a source of multiple voltages, such as microprocessor- based computing equipment.

BACKGROUND ART

All electronic circuits require some source of power from, which to operate. Therefore, a power supply is an essential element of every electronic system.

In recent years, Switch Mode Power Supplies (SMPS) have become a staple of the electronics industry. An example of this type of power supply is disclosed and claimed in U.S. Pat. No. 4,282,567 issued to Voigt. A feature of switch mode power supplies is that they can operate at high frequencies and thus can operate more efficiently using smaller and lighter-weight components than conventional (line frequency) power supplies. Another feature is that a feedback circuit from an output to a switching regulator is used, thereby eliminating the need for a separate inefficient series regulator on the voltage output used as the feedback reference.

It is frequently desired that power supplies be constructed so as to produce multiple simultaneous voltage 33 outputs such as +5VDC, −12VDC, and +12VDC. With conventional power supplies this was accomplished using multitap or multiwinding transformers which produced a variety of different voltage outputs depending upon the relative location of the "taps" or number of turns on the transformer secondary winding. However, this method is impractical when applied to higher-frequency switch mode power supplies, since the frequency dictates use of very low inductance transformer windings (frequently comprising only one turn on the secondary winding).

Available output voltages from a transformer are a function of the ratio of the number of turns in the secondary winding to the number of turns in the primary, according to the general formula:

$$\frac{Vs}{Vp} = \frac{Ns}{Np} \text{ where}$$

Vs=voltage output from the transformer secondary winding
Vp=voltage input to the transformer primary winding
Ns=number of turns on the transformer secondary winding
Np=number of turns on the transformer primary winding Therefore, if Ns is restricted to one turn, obviously there can be but a single Vs for any given combination of Vp and Np.

In commercial switch mode power supplies currently being manufactured, the solution to this problem has been to design the power supply to produce an AC output at the transformer secondary (or at the switching regulator output, if no output transformer is used) sufficiently high such that it can be rectified and filtered to produce the highest DC voltage desired at the output. Lower voltages are then produced by means of additional single component regulators or regulator circuits for each additional output desired. Alternatively, especially where the desired voltages are very dissimilar, a transformer is configured so as to produce one selected voltage relatively precisely, with that voltage being the feedback voltage to the switching regulator circuit of the power supply. The remainder of the desired voltages are produced at the output of the transformer as high approximations of the desired voltages as best as can be obtained by a whole number of winding turns. For instance, a transformer with a 60-volts potential across the primary winding and desired outputs of 5 volts and 12 volts could use 12 primary windings and one secondary winding to accurately produce the 5-volt output with that output being fed back to the switching regulator circuit and with no additional regulation being required on that voltage output. But, since only complete turns are practical on the secondary, the 12-volt output has to be produced by a 3-turn secondary with a 15-volt output, which 15 volts is then regulated by a supplementary series regulator down to the desired 12 volts. But these approaches have several disadvantages:

1) They require additional relatively expensive components.

2) There is a significant sacrifice of efficiency at each independently regulated output, the output efficiency of each such regulator being inversely proportional to the difference between the regulator input voltage and the regulated output voltage.

3) The available power at each output is limited by the power handling capability of the regulator itself.

4) The reliability of the unit is considerably reduced, since the regulators are more prone to failure than many of the other power supply components, and since any increase of active component count will result in a statistical reduction of reliability.

5) Production of negative voltages (as referenced to the "main" power supply DC output voltage) may require additional circuitry.

6) The combined current draw from the transformer might require a larger or more expensive transformer core in order to prevent saturation.

7) The power dissipation in series or shunt regulators produces a considerable amount of heat, thus requiring the use of heat sinks, air circulation space, and wider component spacings, all of which increase the size of the unit.

All of the prior art multiple output switch mode power supplies within the inventor's knowledge have utilized supplementary independent series or shunt regulators for each output required in addition to the control or "feedback" voltage, unless it just happened that auxiliary outputs might be derived from existing voltages without the use of such supplementary regulators. No prior art switch mode power supply to the inventor's knowledge has produced an output additional to its main feedback voltage, except perhaps another voltage coincidentally related to that feedback voltage by a ratio of N1/N2 where both N1 and N2 are integers, without the use of separate regulator circuits on each such additional output.

DISCLOSURE OF INVENTION

Accordingly, it is an object of the present invention to provide a switch mode power supply which will provide multiple output voltages without the need for auxiliary series or shunt regulators.

It is a further object of the present invention to provide a switch mode power supply that is less expensive to manufacture and more reliable than prior art switch mode power supplies.

It is yet another object of the present invention to provide a power supply that uses transformer cores to maximum efficiency by allowing core material and size to be selected individually according to the power required at each power supply output.

It is yet another object of the present invention to provide a power supply that will deliver multiple outputs, each at a required power level, while keeping the total weight and volume of the unit to a minimum.

This invention relates to a switch mode power supply having a conventional switching regulator, which regulator is controlled in a conventional manner by a feedback voltage from a DC output of the power supply, said power supply being also provided with a plurality of output transformers to provide a plurality of outputs without the need for individual voltage regulation on each output.

The multiple transformer switch mode power supply of the present invention uses a plurality of transformers, each transformer being constructed such that the total number of windings thereon is the minimum number which will provide a required output voltage across the transformer secondary winding. This construction allows efficient operation at a desired maximum-frequency, since a quantity of transformer windings consisting of more than the minimum necessary would be of a higher inductance than would a winding of the optimal (minimum) number of turns, and thus would present a higher inductive impedance to the pulsed input voltage, thereby limiting maximum switching frequency, and thereby also reducing efficiencies elsewhere in the switching power supply circuitry.

The transformers of the inventive power supply may be constructed using cores selected such that the smallest and/or least expensive ferrite core which can be used to efficiently deliver the power required for each individual output is utilized for that output.

Briefly, the preferred embodiment of the present invention is a switch mode power supply with multiple direct current outputs, each such output being a rectified and filtered product of a separate output transformer or of the outputs of a combination of transformers. Each of the output transformers has a primary winding which is connected in parallel with the primary windings of each of the other transformers. The primary windings are electrically connected to the output of a switching regulator circuit. A primary/secondary ratio of each transformer is selected such that an alternating current output from each transformer secondary, when rectified and filtered, will result, either individually or in combination with the outputs of other transformers, in a desired direct current output. Further, a total number of turns of wire on each transformer, a size, shape, and material of each transformer ferrite core, and a general construction style for each transformer are chosen based upon well-known and accepted formulas for allowing the transformers to operate efficiently at a desired output power.

The direct current output which is believed to have the greatest need for low tolerance regulation is designated as a master output and is tapped at the output and is connected back to the switching regulator circuit as a feedback signal voltage. Thus, the switching regulator circuit is biased to correct for changes in input voltage to the power supply or in a load impedance connected to that master output. A remainder of the DC voltage outputs are designated as slave outputs. There is no need for supplementary independent voltage regulation on the slave outputs since, in accordance with the present invention, the transformer ratios can be selected to produce the required outputs. These slave output voltages will not vary significantly with changes in the input voltage, since variance resulting from such changes is corrected at the switching regulator circuit as biased by the master output voltage. Further, the slave output voltages will not vary significantly with changes in their individual load impedances, since the ratio of internal output impedance to anticipated load impedance is very low.

The preferred embodiment of the present invention utilizes one transformer per output voltage required. An alternate preferred embodiment may produce a quantity of different outputs greater than the number of transformers used, by taking advantage of already present or easily derived transformer ratios.

The efficiency of the inventive switch mode power supply is considerably greater than that of prior art multiple output power supplies, since the series and/or shunt regulators used in prior art power supplies for the purpose of bringing the approximated desired outputs down to correct levels dissipate a considerable amount of power internally. Thus, the elimination of series and/or shunt regulators directly improves overall efficiency. The elimination of series and/or shunt regulators also considerably increases the overall reliability of the unit, since any reduction of active component count increases statistical reliability of an electronic unit. Elimination of supplementary regulators also serves to increase reliability because solid state regulators are particularly unreliable components, due largely to the fact that they operate at a relatively high heat level. Further, the reduction of heat produced by the unit as a result of the elimination of solid state series and/or shunt regulators allows for a considerable reduction in the size of the power supply, since bulky heat sinks may be eliminated, components may be placed closer together, and air circulation spaces need not be as large. Since the power supply of the present invention gives off less heat than prior art multiple output power supplies, it may be placed closer to other units in an electronic assembly, thereby decreasing necessary overall size of the assembly. Further, since solid state regulators are expensive components, and since the transformers used with the inventive power supply are often not as expensive as those transformers required for use with prior art multiple output switch mode power supplies, the power supply of the present invention may be manufactured more economically than prior art power supplies. Since transformers of the inventive switch mode power supply are not each required to furnish all of the power required at the outputs, these transformers are often smaller and less expensive than the transformers required for prior art multiple output switch mode power supplies, and each transformer is designed to be used to maximum efficiency since it need only be designed to produce the amount of power required. Since the efficient design of the transformers of the inventive switch mode power supply presents no impediment to operation at higher switching frequencies, smaller and less expensive filter components can be used to produce well filtered direct current outputs.

An advantage of the present invention is that no series or shunt regulators are needed to produce the various required output voltages.

Another advantage of the present invention is that the power supply is more reliable than comparable prior art power supplies.

A further advantage of the present invention is that a power supply can be made smaller and can be placed closer to other subsystems within electronic equipment.

Yet another advantage of the present invention is that it is less expensive to manufacture than prior art power supplies.

Yet another advantage of the present invention is that smaller and/or less expensive transformers can be used.

Still another advantage of the present invention is that smaller and less expensive filter components can be used.

BEST MODE FOR CARRYING OUT THE INVENTION

The best presently known mode for carrying out the invention is a switch mode power supply constructed such that a plurality of outputs are produced without the use of supplementary voltage regulation. The power supply uses conventional circuitry including pulse width modulation switch control circuitry, but is equipped with a plurality of output transformers for supplying required voltages. The predominant expected usage of the inventive power supply is in the electronics industry as a component of electronic assemblies such as data processing equipment and other microprocessor based devices.

Figure 1:
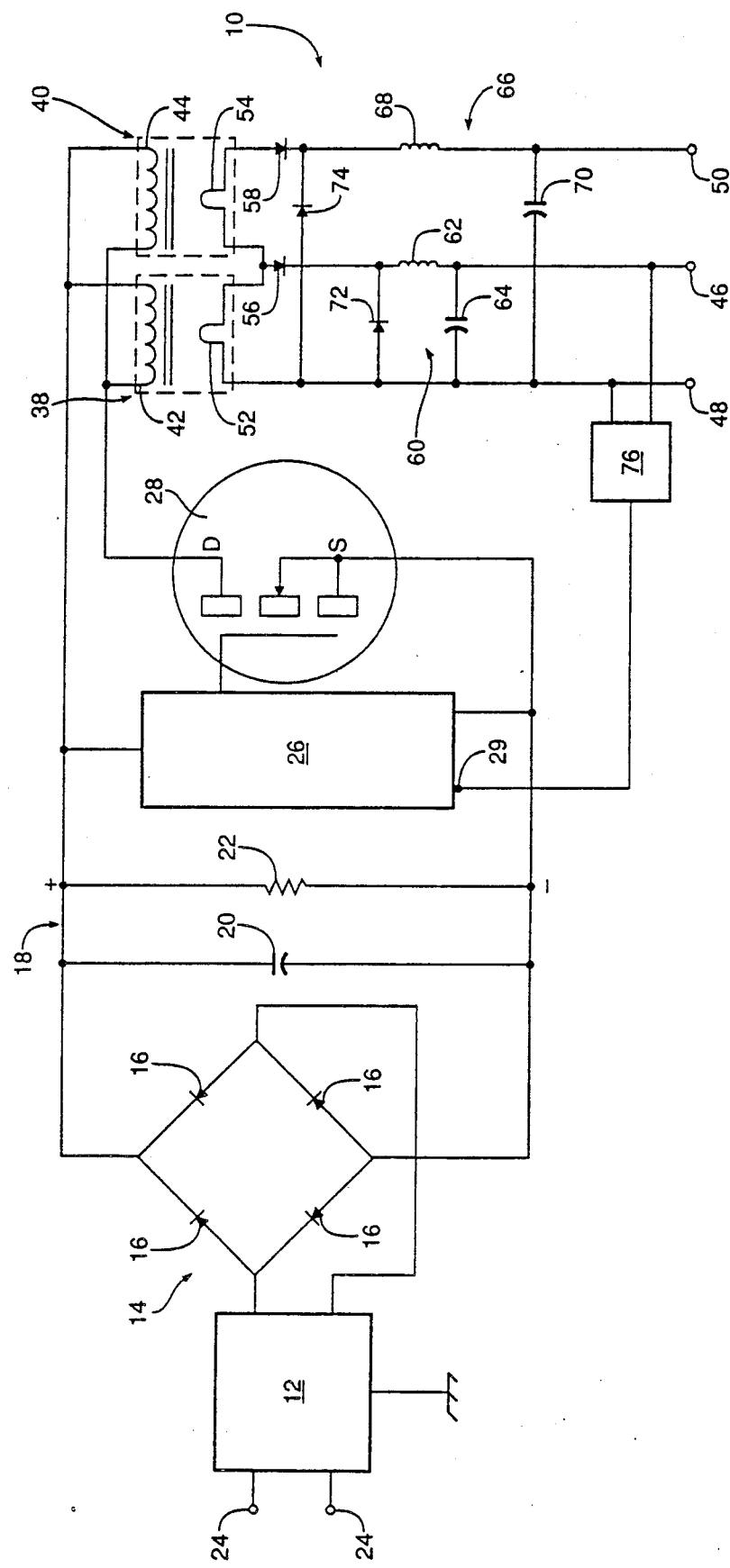
FIG. 1 is a combination schematic and block diagram of a power supply, according to the present invention.

The switch mode power supply of the presently preferred embodiment of the present invention is illustrated in a combination block and schematic form in FIG. 1 and is designated therein by the general reference character 10. In many of its substantial components, the power supply 10 does not differ significantly from conventional switch mode power supplies. The presently preferred embodiment of the invention is shown as a single transistor forward biased type switching power supply. Other arrangements, including two transistor forward biased types are equally within the scope of the invention.

The conventional elements of the power supply 10 include an EMI filter 12, a rectifier circuit 14 including a plurality of rectifier diodes 16 and an input filter circuit 18, including an input smoothing capacitor 20 and an input load stabilization resistor 22. When an alternating current is supplied to a pair of input terminals 24, a DC voltage is supplied across the load stabilization resistor 22. Of course, if power supply 10 were to be designed to operate directly from a DC supply bus (not shown), components 12 through 22 could be eliminated.

A switch control circuit 26 is shown in block diagram form. In the presently preferred embodiment of the present invention, the switch control circuit is a pulse width modulation type. However, any style of switch control circuitry could be used, including frequency variable types of standard switch mode power supply control circuits. A power MOSFET 28 switches on and off under the control of the switch control circuit 26. In the preferred embodiment, the power field effect transistor (MOSFET) 28 switches at a frequency of 100 KHz or higher and with a duty cycle variant depending upon the voltage present at switch control circuit feedback terminal 29. Protection circuits such as are widely known and commonly used in electronics circuits might be included in the design of the power supply 10, although they are not necessary to its operation. For instance, an RC protection circuit (not shown) might be inserted between the drain and source terminals of the power MOSFET 28.

In the presently preferred embodiment of the present invention, a first output transformer (T1) 38 and a second output transformer (T2) 40 are supplied with pulsed current by the switching action of MOSFET 28. A first primary winding (P1) 42 of first transformer (T1) 38 is wired in parallel with a second transformer primary winding (P2) 44 of transformer (T2) 40.

Although several combinations of output voltages might be derived through the use of the two output transformers 38 and 40, the presently preferred embodiment of the invention derives only two voltages (+5VDC and +12VDC) because of the commercial desirability of a power supply 10 producing these two voltages. Examples of other alternative embodiments of the present invention which employ multiple output transformers to derive additional voltage combinations will also be discussed herein.

In the preferred embodiment of power supply 10, positive 5 volts DC is derived at a first output terminal 46 relative to a return terminal 48. Positive 7 volts DC is produced at a second output terminal 50 relative to the first output terminal 46. Thus, positive 12 volts DC is available at the second output terminal 50 relative to the return terminal 48.

A first secondary winding (S1) 52 on first transformer (T1) 38 and a second secondary winding (S2) 54 on second transformer (T2) 40 provide a pulsed current (with the current waveshape having been significantly rounded due to transformer inductance) to a first rectifier diode 56 and a second rectifier diode 58, respectively. The rectified current from secondary winding (S1) 52 is then seen by a first L-type filter circuit 60 comprising a first output smoothing choke 62 and a first output ripple filter capacitor 64. A second L-type filter circuit 66 comprising a second output smoothing choke 68 and a second output ripple filter capacitor 70 draws current, in the presently preferred embodiment of the invention, from the first secondary winding 52 and the second secondary winding 54 which are connected in series. In this embodiment of the invention, both the first secondary winding (S1) 52 and the second secondary winding (S2) 54 are comprised of only a single turn. Secondary windings of a number of turns greater than one might be employed to practice the present invention.

In the presently preferred embodiment of the invention, the first primary winding (P1) 42 is comprised of fifteen turns, and the second primary winding (P2) 44 is comprised of eleven turns. The pulsed voltage applied to primary windings (P1) 42 and (P2) 44 may have a peak amplitude of about 240 volts, depending upon the value of the AC voltage present at input terminals 24.

Since the L-type filters 60 and 66 must supply a smooth DC output from a pulsed input, which pulsed input includes a significant percentage of off (non-conducting) time, the values of the output smoothing chokes 62 and 68 and the output ripple capacitors 64 and 70 must be large enough to permit significant storage of energy between pulses. For this reason, the DC voltage produced will be substantially lower than any peak value of pulsed voltage available at the 13 secondary windings (S1) 52 and (S2) 54. The actual values of components 62, 64, 68 and 70 are chosen according to accepted formulas based upon switching frequency and anticipated (rated) current draw.

A current path to return terminal 48 from the first output terminal 46 for those periods during which no power is provided by transformer (T1) 38 is through a first output filter diode 72. A second output filter diode 74 provides a current path from the second output terminal 50 to the return terminal 48.

DC voltages available at output terminals 46 and 50 are approximately equal to average pulsed voltages supplied by transformer secondary windings (S1) 52 and (S2) 54 (minus the voltage drops across rectifier diodes 56 and 58). The average pulsed voltages at transformer secondary windings (S1) 52 and (S2) 54 are a function of turns ratios of transformers 38 and 40 and of the average pulsed voltage supplied to primary windings (P1) 42 and (P2) 44. In the presently preferred embodiment of the invention, the first primary winding (P1) 42 is comprised of fifteen turns, and the second primary winding (P2) 44 is comprised of eleven turns. Thus, the first transformer (T1) 38 has a turns ratio of 15:1, and the second transformer (T2) 40 has a turns ratio of 11:1. Therefore, when a pulsed voltage of 75 volts average is supplied at primary windings 42 and 44, voltages of approximately 5 volts and 7 volts average (the desired voltages) are available at secondary windings 52 and 54.

In the preferred embodiment of the invention, the second L-type filter circuit 66 is connected across the series connection of the first secondary winding (S1) 52 and second secondary winding (S2) 54. Therefore, the pulsed outputs of both the first transformer (T1) 38 and the second transformer (T2) 40 are combined to produce a DC output at the second output terminal 50. Alternatively, the second L-type filter circuit 66 could be connected across only the second secondary winding (S2) 54, and the resultant DC voltages could be summed to produce the desired outputs.

The DC voltage available at the first output terminal 46 is continuously fed back through an isolator 76 to the switch control circuit 26 through the switch control circuit feedback terminal 29. The switch control circuit 26 adjusts the duty cycle of power MOSFET 28 to keep the voltage present at the first output terminal 46 relatively constant at +5VDC even as input line voltages and output current draw may vary. 18 Since the output voltage derived from the combination of first transformer (T1) 38 and second transformer (T2) 40 is approximately 12 volts at the second output terminal 50 relative to the return terminal 48 when the voltage at the first output terminal 46 is +5VDC relative to the return terminal 48, no additional regulation is required and the +12VDC output at the second output terminal 50 also benefits from the correction for variances in input line voltage produced by the switch control circuit 26 as a result of the feedback voltage present at switch control circuit feedback terminal 29. However, the voltage at the second output terminal 50 will vary somewhat with changes in load. But since greater tolerance is allowable in the +12VDC output than in the +5VDC output for microprocessor based equipment, this is entirely acceptable. Since the +12VDC output is slaved to the control of the +5VDC output, the output at the first output terminal 46 may be referred to as the master output, and the output at the second output terminal 50 may be referred to as the slave output.

The transformers 38 and 40 of the presently preferred embodiment of the invention are toroidal ferrite core types, although any configuration of high frequency transformer might be used. Since, according to the present invention, each transformer 38 and 40 will provide only a portion of the total output power to be furnished by the power supply 10, the transformers 38 and 40 may be a smaller size than would be required for a single transformer (not shown) of a prior art power supply. Alternatively, the transformers 38 and 40 might be made using a less expensive ferrite composition than would otherwise be required. The materials and sizes are chosen according to well known and accepted formulas used by those skilled in the art of transformer construction.

Figure 2:
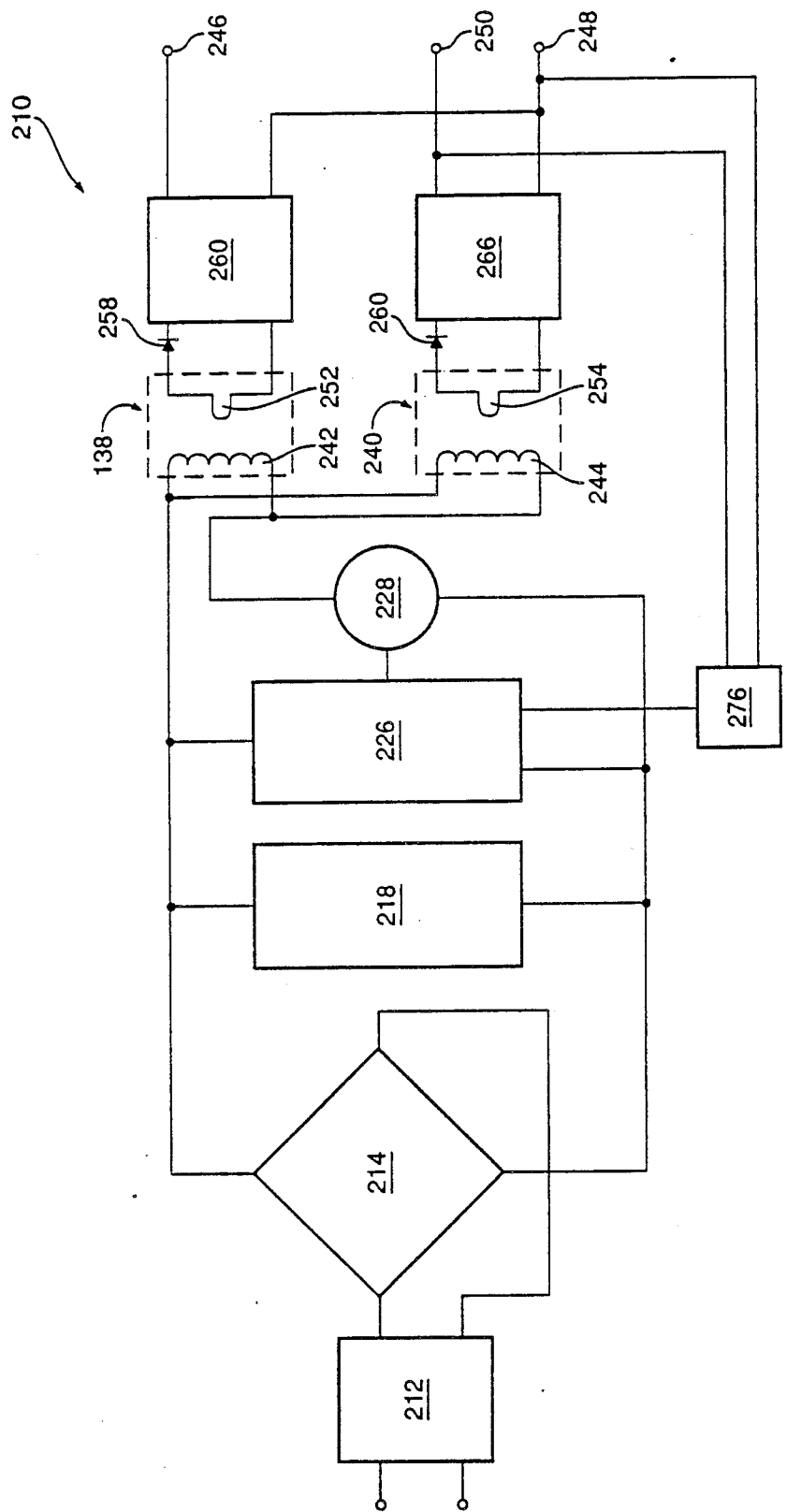
FIG. 2 is a block diagram showing an alternate preferred embodiment of the present invention.

A second equally preferred alternative embodiment of the present invention is depicted in FIG. 2 wherein a power supply 210 is shown in block diagram form. An AC voltage is cleaned by an EMI filter circuit 212, rectified by a rectifier circuit 214, and filtered by an input filter circuit 218. The resultant DC voltage supplies a switch control circuit 226 and a MOSFET 228. The pulsed DC output of the MOSFET 226 feeds a first transformer 238 and a second transformer 240.

In this second equally preferred embodiment of the invention, a first primary winding 242 is comprised of four turns and a second primary winding 244 is comprised of ten turns. Positive 20 volts is provided at a first output terminal 246 relative to a return terminal 248, and positive 8 volts is provided at a second output terminal 250 relative to the return terminal 248 from a first transformer secondary winding 252 and a second transformer secondary winding 254 by the action of a first rectifier diode 256 and a second rectifier diode 258 and a first L-type filter circuit 260 and a second L-type filter circuit 266. The first transformer secondary winding 252 and the second transformer secondary winding 254 are each comprised of one turn. Regulation relative to the second output terminal 250 is provided by feedback through isolator 276.

The power supply 210 of the second preferred embodiment differs from the power supply 10 of the first preferred embodiment in that the second output terminal 250 of the second preferred embodiment is supplied by current from only the second transformer 240, and not from both transformers 238 and 240, since the second secondary winding 254 is not connected in series with the first secondary winding 252 of power supply 210 as are the first secondary winding 52 and the second secondary winding 54 of the first preferred embodiment power supply 10. The second preferred embodiment of the invention illustrates the principle that there are a number of ways of deriving output voltages from the inventive multiple transformer arrangements. Of course, the variations of the first preferred embodiment and the second preferred embodiment could be combined in a single device to produce a still greater variety of output voltages.

Figure 3:
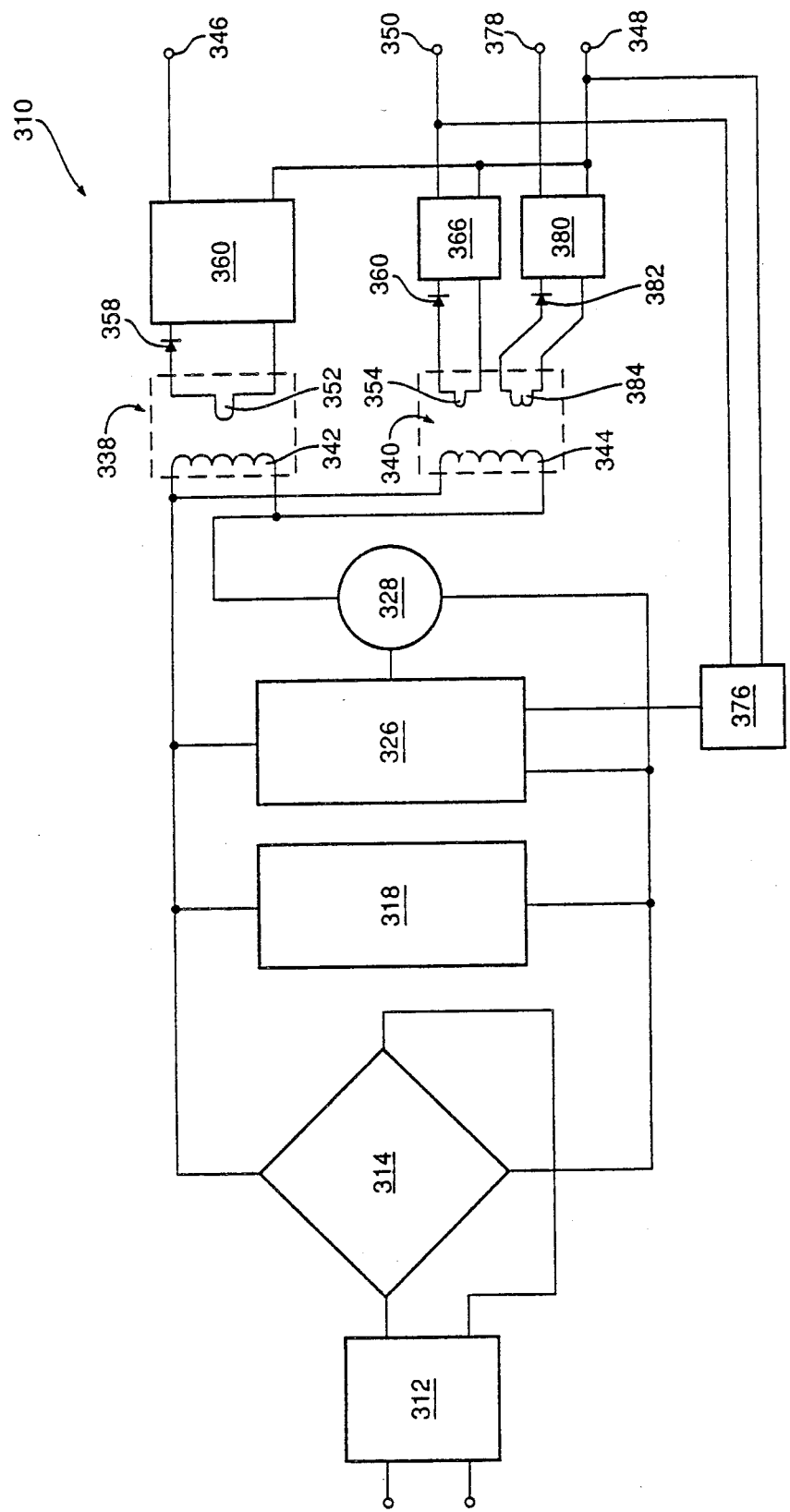
FIG. 3 is a block diagram similar to FIG. 2 showing yet another alternate preferred embodiment of the present invention.

A third preferred embodiment of the present invention is shown in FIG. 3 wherein circuit elements 312 through 376 correspond to like elements 212 through 276 of the second preferred embodiment and perform corresponding functions, including a first transformer 338 and a second transformer 340. As in the second preferred embodiment, a first primary winding 342 is comprised of four turns, and a second primary winding 344 is comprised of ten turns. Positive 20 volts is provided at a first output terminal 346 relative to a return terminal 348, and positive 8 volts is provided at a second output terminal 350 relative to the return terminal 348. However, in the third equally preferred embodiment of the invention, a third output terminal 378 with a DC voltage output of +8 volts is provided using a third L-type filter circuit 380, a third rectifier diode 382 and a third secondary winding 384 comprised of two turns, which third secondary winding 384 is a part of the second transformer 340. The third secondary winding 384 is wound on the transformer 340 at any part of the transformer core (not shown) and is constructed in the same manner as the second secondary winding 354. The third secondary winding 384 is used to take advantage of the fact that the second primary winding 344 comprised of ten turns is already present in the construction of the power supply 310. Therefore, it is not necessary to add yet another transformer to attain the desired turns ratio of 10:2. The third equally preferred embodiment of the present invention is an example of another way of combining voltages available through the use of the inventive multiple transformer arrangement to derive output voltages that are sufficiently close to desired output values such that individual regulation of outputs is not required.

Various modifications may be made to the invention without altering its value or scope. For example, the preferred embodiment and the two alternate embodiments have been described in terms of power supplies having two output transformers each. There is no reason that a greater number of transformers could not be used to obtain the objective of deriving desired voltages with a minimum number of total transformer turns for each output.

Another conceivable change would be to connect the primaries of the transformers in series.

Yet another conceivable modification of the present invention would be to combine the inventive multiple output transformer arrangement with any of the several well known and practiced switch mode power supply switching circuits including push-pull, flyback, and resonant mode types.

Yet another conceivable modification would be to incorporate full wave rectification, or other type rectification on the output side.

The inventive method would also be equally useful in applications where only a single output voltage is actually desired, where that single output voltage could be best obtained as a sum of two (or more) voltages obtained by the inventive method.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

INDUSTRIAL APPLICABILITY

Power supplies are a necessary part of every electronics assembly, and switch mode type power supplies are one of the most used varieties. In many fields of electronics, switch mode type power supplies are used exclusively. The inventive multiple transformer switch mode power supply represents a significant advance in the field, since it achieves the objectives of providing a smaller power supply at a lower cost than prior art designs. Since these are the very qualities most sought after by users of these supplies, and which all providers of power supplies have endeavored to attain, it is expected that power supplies constructed according to the present invention will find wide acceptance as replacements for existing power supplies, and as components in newly designed electronic equipment.

For these and other reasons, it is expected that the utility and industrial applicability of the invention will be both significant in scope and long-lasting in duration.

I claim:

1. A switch mode power supply, comprising:
    a) a switching regulator;
    b) a plurality of output transformers electrically connected to an output of said switching regulator, each of said output transformers including:
        a primary winding comprising a number of turns of a first winding wire equal to an integer X; and a secondary winding comprising a number of turns of a second winding wire equal to an integer Y, wherein;
        Y is first chosen to be the lowest integer for which there is an integer X such that a transformer turns ratio of X/Y will produce a desired output voltage from a given input voltage, to within an allowable tolerance; and
        X is then chosen to be an integer such that a transformer turns ratio of X/Y will produce said output voltage to within said allowable tolerance from the given input voltage;
    c) one or more output rectifiers electrically connected to one or more of said secondary windings; and
    d) one or more output filters electrically connected to one or more of said output rectifiers.

2. The switch mode power supply of claim 1, wherein:
    each of said secondary windings are electrically connected directly to one of said output rectifiers, and each of said output rectifiers is electrically connected directly to one of said output filters such that a DC resultant voltage is produced for each of said secondary windings which is the average per cycle value of the output voltage associated with said secondary winding minus a voltage drop occurring across the output rectifier and the output filter associated with said secondary winding.

3. A switch mode power supply, comprising:
    a) a switching regulator;
    b) a plurality of output transformers electrically connected to an output of said switching regulator, each of said output transformers including:
        a primary winding comprising a number of turns of a first winding wire equal to an integer X; and at least one secondary winding, each of said secondary windings comprising a number of turns of a second winding wire equal to an integer Y, wherein;

Y is first chosen to be the lowest integer for which there is an integer X such that a transformer turns ratio of X/Y will produce a desired output voltage from a given input voltage, to within an allowable tolerance; and X is then chosen to be an integer such that a transforemr turns ratio of X/Y will produce said output voltage to within said allowable tolerance from the given input voltage;

c) one or more output rectifiers electrically connected to one or more of said secondary windings; and d) one or more output filters electrically connected to one or more of said output rectifier sections.

4. The switch mode power supply of claim 3, wherein:

each of said secondary windings is electrically connected directly to one of said output rectifiers; and each of said output rectifiers is electrically connected directly to one of said output filters, such that:

a DC resultant voltage is produced for each of said secondary windings which is the average per cycle value of the output voltage associated with each of said secondary windings minus a voltage drop occurring across the output rectifier and the output filter associated with each of said secondary windings.

* * * * *